(12) United States Patent
Dolan et al.

(10) Patent No.: US 12,737,747 B2
(45) **Date of Patent: *Sep. 15, 2026**

(54) PEER TO PEER MOBILE TRANSACTIONS LEVERAGING PERSONAL AREA NETWORKS AND ROBUST POST-TRANSACTION VERIFICATION

(71) Applicant: Bank of America Corporation, Charlotte, NC (US)

(72) Inventors: Heather Dolan, Sarasota, FL (US); Manu Kurian, Dallas, TX (US); Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/045,609

(22) Filed: Feb. 5, 2025

(65) Prior Publication Data

US 2025/0182087 A1 Jun. 5, 2025

Related U.S. Application Data

(63) Continuation of application No. 17/861,405, filed on Jul. 11, 2022, now Pat. No. 12,248,925.

(51) Int. Cl.
*G06Q 20/32* (2012.01)
*G06Q 20/06* (2012.01)
*G06Q 20/40* (2012.01)

(52) U.S. Cl.
CPC ..... *G06Q 20/3224* (2013.01); *G06Q 20/0655* (2013.01); *G06Q 20/4014* (2013.01)

(58) Field of Classification Search
CPC .. G06Q 20/3223; G06Q 20/36; G06Q 20/389; G06Q 20/0655; G06Q 20/4014;
(Continued)

(56) References Cited

U.S. PATENT DOCUMENTS 10,885,519 B1 * 1/2021 Nguyen ............ G06Q 20/4033
10,984,416 B2 4/2021 Ilincic et al.
(Continued)

OTHER PUBLICATIONS

I. Turk, P. Angin and A. Cosar, "RONFC: A Novel Enabler-Independent NFC Protocol for Mobile Transactions," in IEEE Access, vol. 7, pp. 95327-95340, 2019, doi: 10.1109/ACCESS.2019.2929011. (Year: 2019).*

(Continued)

*Primary Examiner* — Ryan D Donlon
*Assistant Examiner* — Steven R Chism
(74) *Attorney, Agent, or Firm* — Weiss & Arons LLP

(57) ABSTRACT

A method for facilitating electronic transactions between a first mobile device and a second mobile device is provided. At a central server, when internet connection is established, the method may include receiving transaction data and prior to processing an electronic transaction based on the transaction data, verifying the electronic transaction. The verifying may include retrieving a first activity log from the first mobile device and a first browser timeout history. The method may further include retrieving from the second mobile device a second activity log and a second browser timeout history. The method may further include verifying that a first mobile application was active when a browser on the first mobile device was in timeout and that a second mobile application was active when a browser on the second mobile device was in timeout.

9 Claims, 9 Drawing Sheets

(58) Field of Classification Search
CPC ......... H04W 4/14; H04W 4/80; H04W 84/12; H04W 12/50; H04W 4/70; H04W 80/04
See application file for complete search history.

(56) References Cited

U.S. PATENT DOCUMENTS

| | | | | |
|---|---|---|---|---|
| 11,328,294 | B2 | 5/2022 | Foster, Jr. | |
| 2013/0218766 | A1 | 8/2013 | Mueller | |
| 2015/0078296 | A1 | 3/2015 | Son et al. | |
| 2015/0142654 | A1* | 5/2015 | Zamer | G06Q 20/3278 705/44 |
| 2017/0244841 | A1* | 8/2017 | Costandi | H04L 65/1069 |
| 2017/0344962 | A1 | 11/2017 | Agrawal et al. | |
| 2022/0005037 | A1 | 1/2022 | Kapur et al. | |

OTHER PUBLICATIONS

U. Goel, M. P. Wittie, K. C. Claffy and A. Le, "Survey of End-to-End Mobile Network Measurement Testbeds, Tools, and Services," in IEEE Communications Surveys & Tutorials, vol. 18, No. 1, pp. 105-123, Firstquarter 2016, doi: 10.1109/COMST.2015.2485979 (Year: 2016).*

Kai Fan et al., "Secure Authentication Protocol for Mobile Payment," Tsinghua Science and Technology, vol. 23, No. 5, pp. 610-620, Oct. 2018, doi: 10.26599/TST.2018.9010031.

M. Obaid and R. Hodrob, "Peer to Peer Real-Time Mobile Payment Scheme," 2022 International Arab Conference on Information Technology (ACIT), Abu Dhabi, United Arab Emirates, 2022, pp. 1-6, doi: 10.1109/ACIT57182.2022.9994208.

* cited by examiner

FIG. 2
200
102
DEVICE 1
Account 2345
Send to: John Doe
Total: $150.00
Submit
214
206
104
DEVICE 2
Device 1 is attempting to connect.
Accept
Deny
216
210
208
Local Memory
Account: 2345
Balance: $1,000.00
Account: 4512
Balance: $650.00
212
Local Memory
Account: 9988
Balance: $800.00

302

DEVICE APPLICATION ACTIVITY LOG - Device 1

304 306 308 310

| APP | Date Used | Usage Time | Start Time |
|---|---|---|---|
| File Explorer | 1/1/2021 | 03:05 | 9:07 AM |
| Firefox | 1/1/2021 | 25:39 | 10:36 AM |
| Pictures Snap | 1/1/2021 | 12:05 | 11:50 AM |
| Calendar | 1/1/2021 | 3:49 | 12:20 PM |
| MYBank | 1/21/2021 | 7:21 | 1:17 PM |

312

DEVICE APPLICATION ACTIVITY LOG - Device 2

| APP | Date Used | Usage Time | Start Time |
| --- | --- | --- | --- |
| Chrome | 1/1/2021 | 21:20 | 8:05 AM |
| Calendar | 1/1/2021 | 6:56 | 9:17 AM |
| MYBank | 1/1/2021 | 5:05 | 1:18 PM |
| Word | 1/1/2021 | 1:06:01 | 2:05 PM |
| Excel | 1/21/2021 | 45:20 | 3:30 PM |

| EVENT TIME | EVENT TYPE | NETWORK NAME |
| --- | --- | --- |
| 10:36 AM | Connected | Intel Ethernet |
| 1:15 PM | Disconnected | Intel Ethernet |
| 1:25 PM | Connected | Intel Ethernet |
| 2:37 PM | Connected | Intel Ethernet |
| 4:55 PM | Connected | Intel Ethernet |
| 10:08 PM | Disconnected | Intel Ethernet |

412

BROWSER TIMEOUT HISTORY - Device 2

414 416 418

| EVENT TIME | EVENT TYPE | NETWORK NAME |
| --- | --- | --- |
| 9:05 AM | Connected | Intel Ethernet |
| 1:15 PM | Disconnected | Intel Ethernet |
| 2:20 PM | Connected | Intel Ethernet |
| 6:30 PM | Connected | Intel Ethernet |
| 10:25 PM | Connected | Intel Ethernet |
| 11:59 PM | Disconnected | Intel Ethernet |

PEER TO PEER MOBILE TRANSACTIONS LEVERAGING PERSONAL AREA NETWORKS AND ROBUST POST-TRANSACTION VERIFICATION

FIELD OF TECHNOLOGY

Aspects of the disclosure relate to facilitating peer to peer mobile device transactions. Specifically, aspects of the disclosure relate to leveraging personal area networks and post-transaction verification when performing peer to peer mobile device transactions.

BACKGROUND OF THE DISCLOSURE

Today, online transactions are constantly occurring for transferring electronic funds between individuals, businesses and corporations. Typically, an internet connection is required to support these online transactions. However, sporadic loss of internet connection does occur. It would be desirable, therefore, to provide systems and methods for supporting electronic transactions between two accounts independent of internet connection.

Such systems and methods, however, present a security risk to the banking system from which funds are transferred while offline. This is at least because while offline, the banking system may not be enabled to verify the peer to peer transactions and a most current account data. It would therefore be further desirable to balance the consumer's need for offline transactions with the banking system's need for robust and current transaction data.

It is further desirable, therefore, to provide systems and methods for supporting offline data transactions coupled with robust verification methods to ensure data integrity and protect account functionality.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 4B shows an illustrative diagram in accordance with principles of the disclosure.

DETAILED DESCRIPTION OF THE DISCLOSURE

Figure 1:
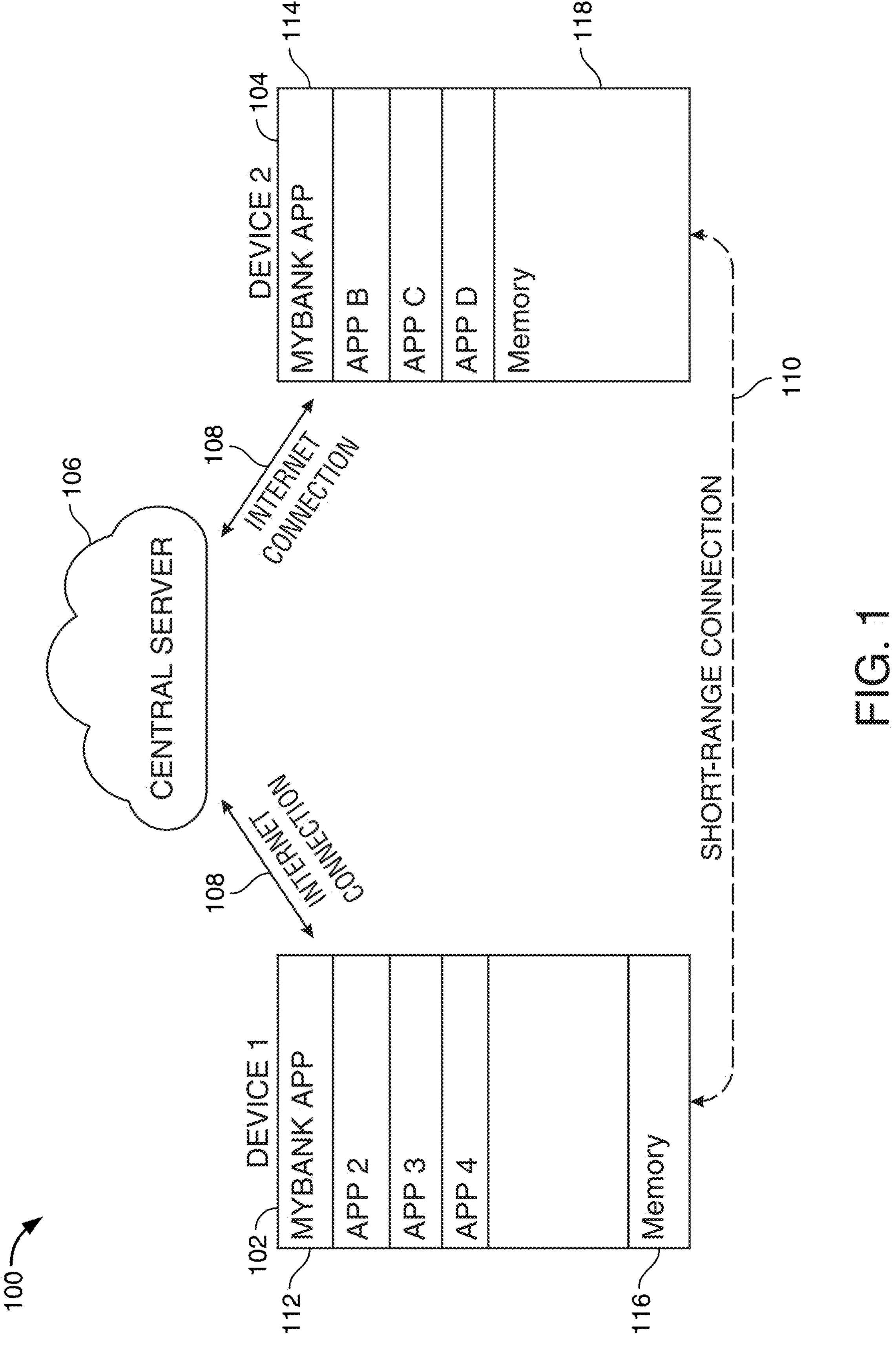
FIG. 1 shows an illustrative system architecture in accordance with principles of the disclosure.

A method for facilitating electronic transactions between a first mobile device and a second mobile device is provided. The method may leverage a short-range network when both the first mobile device and the second mobile device do not support internet connection. The electronic transactions may occur on a first mobile application operational at the first mobile device and on a second mobile application operational at the second mobile device.

The first mobile application and the second mobile application may each be applications that provides access to a service. The service may be a protected service. A protected service may be secured by a username and password or other credentials.

It should be appreciated that any functions described herein as being performed by the first mobile device are to be understood to be performed by the first mobile application and/or an additional application running on the first mobile device.

It should further be appreciated that any functions described herein as being performed by the second mobile device are to be understood to be performed by the second mobile application and/or an additional application running on the second mobile device.

The first mobile application may be an application running on the first mobile device. The first mobile application may be enabled to be active without internet connection being established. The first mobile application may be in sync to an online mobile application. The online mobile application running on the first mobile device may be associated with a user of the first mobile device. The first mobile application may simulate the experience of the online mobile application when internet connection is not established.

The second mobile application may be an application running on the second mobile device. The second mobile application may be enabled to be active without internet connection established. The first mobile application may be in sync to an online mobile application that may include an account associated with the user of the second mobile device. The second mobile application may simulate the experience of the online mobile application when internet connection is not established.

It should be appreciated that in some embodiments, the online mobile application associated with the first mobile application and the online mobile application associated with the second mobile application, may be the same application running by the same entity.

In some embodiments, the online mobile application associated with the first mobile application may be a different application from the online mobile application associated with the second mobile application and may be run by a different entity than the first mobile application.

The first and second mobile device may include hardware and software. The software may include multiple modules. A software module is a component of the software that is responsible for performing a target function. The software and its associated modules may be executed on a computer system. The computer system may include a mobile device. The computer system may include a plurality of mobile devices. The computer system may include a remote computer system. The computer system may be a network connected computer system.

Mobile devices may include, but may not be limited to a smartphone, laptop, smartwatch and tablet.

There are many applications that an individual may launch on a mobile device. Some of these applications may be executed more often than other applications. There are some applications that may be launched a few times throughout a day. There are some applications that may be running continuously. For example, a banking app where an individual can view an account balance and/or perform transactions may be accessed many times throughout the day. Additionally, an individual's business app may be constantly running on the individual's mobile device.

The banking application may be in electronic communication with a central server. The electronic communication may be enabled via a wireless internet connection.

The method may include, at the first mobile device, receiving a request to initiate an electronic transaction with a recipient. The electronic transaction may be a transferring of electronic funds to the recipient. The request may identify the recipient and a value of funds for transferring to the recipient.

In response to receiving the request at the first mobile device, the method may include accessing a periodically updated database stored by the first mobile device. The periodically updated database may store information relating to a first account. The first account may include a first user profile including a username, password, and an account balance.

The periodically updated database may be a database that resides at the first mobile device. The periodically updated database may be synced periodically to data stored in a database at the central server. The database at the central server may be associated with the online mobile application. The periodically updated database may continually store, and update, via the syncing, account data including an account balance of the user of the first mobile device. The account data may be updated periodically by retrieving the online account data from the database at the central server. Following retrieval of the online account data, the account data at the periodically updated database may be overwritten with the online account data.

In response to a determination that the account balance is greater than the value of funds, the method may include authorizing the request.

Prior to performing the transaction, the method may include determining whether an internet connection is established.

The method may include determining that the first mobile device fails to establish an internet connection. In response to the determining, the method may include transmitting a short-range communication request to establish a communication session with a second mobile device. The first mobile device may be within close proximity to the second mobile device. The distance may be a few centimeters, inches, 1 foot, 4 feet, ten feet or any other suitable distance.

The short-range communication may be established via Bluetooth® or Near-Field Communication ("NFC").

The method may further include, at the first mobile device, transmitting a verification request to the second mobile device. The verification request may be a request to verify that a user of the second mobile device is the recipient.

At the second mobile device, the method may include determining that the second mobile device fails to establish an internet connection.

In response to the failing of establishing the internet connection, the method may include, at the second mobile device, selecting to establish the short-range communication session with the first mobile device.

The method may include verifying that the recipient is the user of the second mobile device. The verifying may include, at the second mobile device, retrieving from a periodically updated database at the second mobile device, data identifying the user of the second mobile device. The data may include a username and an account number of the user of the second mobile device.

The method may further include at the first mobile device, receiving from the second mobile device, a second mobile device identifier, and the data in response to the verification request.

The method may further include, at the first mobile device, verifying that the data is associated with the recipient.

At the second mobile device, the method may include, in response to receiving the verification from the first mobile device, updating an account balance of a second account associated with the recipient. The updating may include increasing the account balance by an amount equal to the value of funds. The account balance may be stored in the periodically updated database at the second mobile device.

At the first mobile device, the method may include updating the account balance in the first account to reflect the transfer.

Following the updating at the first and second mobile device, the method may include, transmitting transaction data associated with the transfer into a transaction processing queue. The transaction processing queue may hold the transaction data and the associated transfer pending a re-establishment of the internet connection. Once the internet connection has been re-established, the online account associated with each of the users of the first and second mobile devices may be updated based on the local transfer.

For example, a user may initiate a request to transfer funds to a recipient using an online mobile application on the user's mobile phone. Prior to, during the initiation, or prior to the completion of, the request, the user's mobile phone may lose internet connection and the request to transfer funds may be terminated. At this point, the systems and methods of the invention may initiate the methods steps detailed herein to enable the user to complete the transaction at the mobile application at the user's device without supporting internet connection. The funds may be transferred to the recipient using a short-range network as described herein. Once the mobile phone reconnects to the internet, the mobile phone may transmit the data to a central server to update the user's account balance.

At a central server, when internet connection is re-established, the method may include receiving the transaction data from the transaction processing queue. The transaction data may include the name and account number of the user of the first mobile device. The transaction data may also include the value of funds transferred to the second mobile device. The transaction data may further include the name and account number of the user of the second mobile device.

It should be appreciated that any functions described herein as being performed by the central server are to be understood to be performed by an application running on the central server. This application may be accessed via the first mobile device and the second mobile device when an internet connection is established.

Prior to processing the electronic transaction at the central server based on the transaction data, the method may include verifying the electronic transaction. The verifying may include retrieving from the first mobile device a first activity log storing a log of applications accessed on the first mobile device and a timestamp for each accessed application. The verifying may further include retrieving a first browser timeout history from the first mobile device.

The method may further include retrieving from the second mobile device a second activity log storing a log of applications accessed on the second mobile device and a timestamp for each accessed application. The method may also include retrieving from the second mobile device a second browser timeout history.

Following a receipt of the first activity log, the first browser timeout history, the second activity log and the second browser timeout history, the method may include verifying that the first mobile application was active when a browser timeout has occurred on the first mobile device.

The method may further include verifying that the second mobile application was active when a browser timeout has occurred on the second mobile device.

Furthermore, the central server may be configured to verify that a timestamp of use of the first mobile application overlaps with a timestamp of use of the second mobile application, or differs from a timestamp of a use of the second mobile application by a predetermined amount such as 10 seconds, 30 seconds, 1 minute, 3 minutes, or any other suitable amount.

In response to the verifying, the method may include processing the request. The processing may include updating an online account balance of the user of the first mobile device and an online account balance of the user of the second mobile device to reflect the transfer.

When it is determined that the mobile application performing the request was not in-use while the browser was on timeout, the method may include denying the request.

When it is determined that the timestamp of the use of the mobile application on the first mobile device is not within a pre-determined range of the timestamp of the use of the mobile application on the second mobile device, the method may include denying the request.

It should be appreciated that while internet connection is established and connected, the method may include, at pre-determined intervals, performing an overwrite by updating the account balance at the first mobile device and the account balance at the second mobile device to be in sync with the online account balance.

The method may further include, preferably prior to updating the online account balance of the user of the first mobile device, identifying a discrepancy between the online account balance of the user of the first mobile device and the account balance stored locally in the periodically updated database at the first mobile device.

It should be appreciated that the discrepancy may be an identification that the online account has insufficient funds to enable performing the transfer.

When the discrepancy is identified, the method may include cancelling the updating of the online account balance of the first mobile device and the online account balance of the second mobile device.

Additionally, following the cancelling, the method may include transmitting an electronic communication to the first mobile device and to the second mobile device notifying the discrepancy.

In some embodiments, following the transmitting of the electronic communication, the method may include at the second mobile device, reversing a change in the account balance due to the transfer. The method may further include at the first mobile device, reversing a change in the account balance due to the transfer.

In some embodiments, when a discrepancy is identified, the method may additionally include overwriting the account balance at the first mobile device with the online account balance associated with the user of the first mobile device. The method may also include overwriting the account balance at the second mobile device with the online account balance associated with the user of the second mobile device.

A system for facilitating electronic transactions between a first mobile device and a second mobile device is provided. The system may leverage a short-range network when both the first mobile device and the second mobile device do not support internet connection.

The system may include a first mobile application running on the first mobile device and supporting electronic communication with a central server.

The first mobile device may be configured to receive a request to initiate an electronic transaction with a recipient. The electronic transaction may include a value of funds for transferring to the recipient.

In some embodiments, the request may be inputted on a user interface ("UI") at the first mobile device. The inputted data may include an account number associated with the user of the second mobile device. The inputted data may also include a selection of a second mobile device identifier for being the recipient of the transaction. The inputted data may further include the amount of funds to be transferred from the account associated with the user of the first mobile device to the account associated with the user of the second mobile device.

The processor of the first mobile device may be configured to receive the inputted data and transmit a request to the second mobile device for communicating and performing the transaction.

It should be appreciated that the first mobile application and the second mobile application may be configured to display data and receive input on the UI of the device.

The first mobile device may be further configured to access a periodically updated database storing a first account. The first account may include an account balance.

In response to a determination that the account balance is greater than the value of funds, the first mobile device may be configured to authorize the request.

Following authorization, the first mobile device may attempt to connect to an online mobile application associated with the first mobile application. The first mobile device may fail to establish an internet connection. When internet connection fails to be established, the first mobile device may be configured to transmit a short-range communication request to establish a communication session with a second mobile device. The short-range communication request may be enabled to be transmitted when the second mobile device is within a distance of the first mobile device. The distance may be a distance that enables a personal area network ("PAN") connection. The distance may be a distance that enables a local area network ("LAN") connection.

The communication request may include a verification request for verifying that a user of the second mobile device is the recipient.

The system may further include a second mobile application running on the second mobile device. The second mobile device may support electronic communication with the central server. The second mobile device may be configured to, in response to a receipt of the verification from the first mobile device, update an account balance of a second account associated with the recipient. The updating may include increasing the account balance by an amount equal to the value of funds. The account balance may be stored at the second mobile device.

The second mobile device may be configured to transmit transaction data associated with the transfer into a transaction processing queue. The transaction processing queue may temporarily store the transaction data pending an establishment of internet connection. When internet connection is established, the transaction data may be transmitted to the central server for processing. In some embodiments, the transaction processing queue may include a queue with a plurality of transactions waiting for processing when internet connection is disconnected for a greater period of time.

Since the transaction data waiting in the queue to be processed are transactions that have been executed when offline, the transaction data may be verified by the central server through the methods of reviewing application activity log and browser timeout history log to determine whether the transactions are authentic or fake. For example, a transaction executed while a mobile phone was purportedly offline, while the browser history shows regular browser activity while the transaction was executed, may be determined to be a fake transaction. As such, transactions executed by the systems and methods of the invention may only be deemed to be real if the mobile phones executing the transaction were not connected to the internet while the transaction was taking place.

The central server may be configured to receive the transaction data from the transaction processing queue.

Following receipt of the transaction data, the central server may be configured to verify that the transaction data associated with the transaction between the first mobile device and the second mobile device is accurate and not fraudulent.

The central server may be configured to request from the first mobile device a first activity log storing a log of applications accessed on the first mobile device and a timestamp for each accessed application.

The central server may be further configured to request from the first mobile device, a first browser timeout history.

The central server may also be configured to request from the second mobile device a second activity log storing a log of applications accessed on the second mobile device and a timestamp for each accessed application. The central server may further be configured to request from the second mobile device, a second browser timeout history.

Following a receipt of the first activity log, the first browser timeout history, the second activity log and the second browser timeout history, the central server may be configured to verify that the first mobile application was active when a browser on the first mobile device was in timeout. Additionally, the central server may be configured to verify that the second mobile application was active when a browser on the second mobile device was in timeout.

Furthermore, the central server may be configured to verify that a timestamp of use of the first mobile application overlaps with a timestamp of use of the second mobile application, or differs from a timestamp of a use of the second mobile application by a predetermined amount such as 10 seconds, 30 seconds, 1 minute, 3 minutes, or any other suitable amount.

In response to the verifying, the central server may be configured to process the request within an online account associated with the user of the first mobile device and the user of the second mobile device. The processing may include updating an online account of the user of the first mobile device and an online account of the user of the second mobile device to reflect the transfer.

When it is determined that the first mobile application performing the request was not in-use while the internet connection was on timeout, the central server may be configured to deny the request.

When it is determined that the timestamp of the use of the first mobile application is not within a pre-determined range of the timestamp of the use of the second mobile application, the central server may also be configured to deny the request.

At pre-determined intervals, while internet connection is established, the first mobile device and the second mobile device may be configured to retrieve account data from the central server for each of the first account and the second account and update account data stored in the periodically updated database on each of the first mobile device and the second mobile device. This updating may be performed throughout the day whether or not a transaction has been performed at the mobile devices.

In some embodiments, following the retrieval of the transaction data from the transaction processing queue, the method may include, at the central server, requesting from the first mobile device and the second mobile device, the activity log storing a log of applications accessed on each of the first mobile device and the second mobile device and a timestamp for each accessed application.

Following receipt of the request at the first mobile device and second mobile device, the method may include the first mobile device transmitting to the central server, the activity log and the timestamp. The method may further include the second mobile device transmitting to the central server the activity log and the timestamp.

In some embodiments, prior to verifying the transaction data via the activity logs and browser timeout histories, the method may include updating the online account associated with the user of the first mobile application and the online account associated with the user of the second mobile application to include the transaction and further flagging the transaction as pending.

Following the processing of the request, the method may include updating the transaction status to complete.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative system architecture 100. System architecture 100 may include a first device 102 and a second device 104. First device 102 may be enabled to communicate electronically with second device 104.

In this exemplary diagram, device 102 and device 104 may be a smartphone. Device 102 and device 104 may include hardware and software of a computing device such as the computing device illustrated in FIGS. 6 and 7 herein.

Each of devices 102 and 104 may have multiple applications running on the device. The applications may require internet connection to enable accessing the application. However, some of the applications may be downloaded on to the device itself and may not require an internet connection when using the application.

'MyBank App' 112 may be an application running on device 102 that manages a personal account associated with the user of device 102. 'MyBank App' 112 may be downloaded and running on the device itself. It should be appreciated that 'MyBank App' 112 may simulate an actual online application running on the central server 106 and may at pre-determined intervals, sync the data from the online application to the 'MyBank App' 112.

'MyBank App' 114 may be an application running on device 104 that manages a personal account associated with the user of device 104. 'MyBank App' 114 may be downloaded and running on device 104. It should be appreciated that 'MyBank App' 114 may simulate an actual online application running on the central server 106 and may at pre-determined intervals, synchronize the data from the online application to the 'MyBank App' 114.

Device 102 and device 104 may be enabled to communicate electronically. The communication may be for performing transactions between the two devices. The electronic communication may be enabled via a Wifi connection as shown at 108.

When Wifi connection 108 is disconnected, device 102 and device 104 may be enabled to communicate electronically via a short-range connection, as shown at 110. The short-range connection may be via Bluetooth®, NFC or any other suitable short-range connection. Electronic communication using the short-range connection 110 may be enabled when the two devices are within close proximity.

When utilizing NFC, the proximity between device 102 and device 104 may be equal to or less than a predetermined spatial separation based on the strength of the NFC signal. When utilizing Bluetooth®, the proximity between device 102 and device 104 may be equal to or less than a predetermined spatial separation based on the strength of the Bluetooth® signal.

Additionally, when internet connection 108 is disconnected and a transaction is performed between device 102 and device 104 via the local application 'MyBank App' 112 and 'MyBank App' 114, the central server 106, when reconnected, may sync the data from the local mobile applications to the online mobile applications.

Figure 2:
FIG. 2 shows an illustrative diagram in accordance with principles of the disclosure.

FIG. 2 shows an exemplary diagram 200 of a communication between device 102 and device 104 for performing a transaction. Exemplary diagram 200 shows device 102 attempting to communicate with device 104 when internet connection is disrupted.

The internet status for device 102 is shown at icon 206. Icon 206 displays the 'no internet' status icon, which is displayed when internet connection is disrupted.

The internet status for device 104 is shown at icon 210. Icon 210 displays the 'no internet' status icon.

The internet connection may have been disconnected prior to the start of initiating the transaction. In some embodiments, the internet connection may have been disrupted during the performing of the transaction. When the internet connection is disrupted following the initiating, device 102 and device 104 may be enabled to automatically switch network connections to a short-range connection to complete the transaction. This would further include accessing the application stored locally on the device since access to the online application has been disrupted.

At device 102, UI 214 displays user input of data associated with a request to transfer electronic funds to a user account associated with device 104. The request includes a name of the recipient. In this exemplary diagram, the name of the recipient is 'John Doe.' The request further includes the account number associated with 'John Doe.' The request further includes the value of funds to be transferred. The total value of funds displayed is '150.00'.

Prior to transferring the value of funds, an acceptance of the request from device 104 may be required to enable pairing the two devices together.

UI 216 displays a request from device 102 for pairing. UI 216 may accept user input of an acceptance or denial to the request for pairing.

Device 102 may store user data associated with an account. The account may be associated with the 'MyBank App' 112. The user data may be stored in a local memory 208 at device 102. The user of device 102 may have two accounts stored in the local memory 208.

Device 104 may store user data associated with an account of the user of device 104. The account may be associated with the 'MyBank App' 114. The user data may be stored in a local memory 212 at device 104.

Figure 3A:
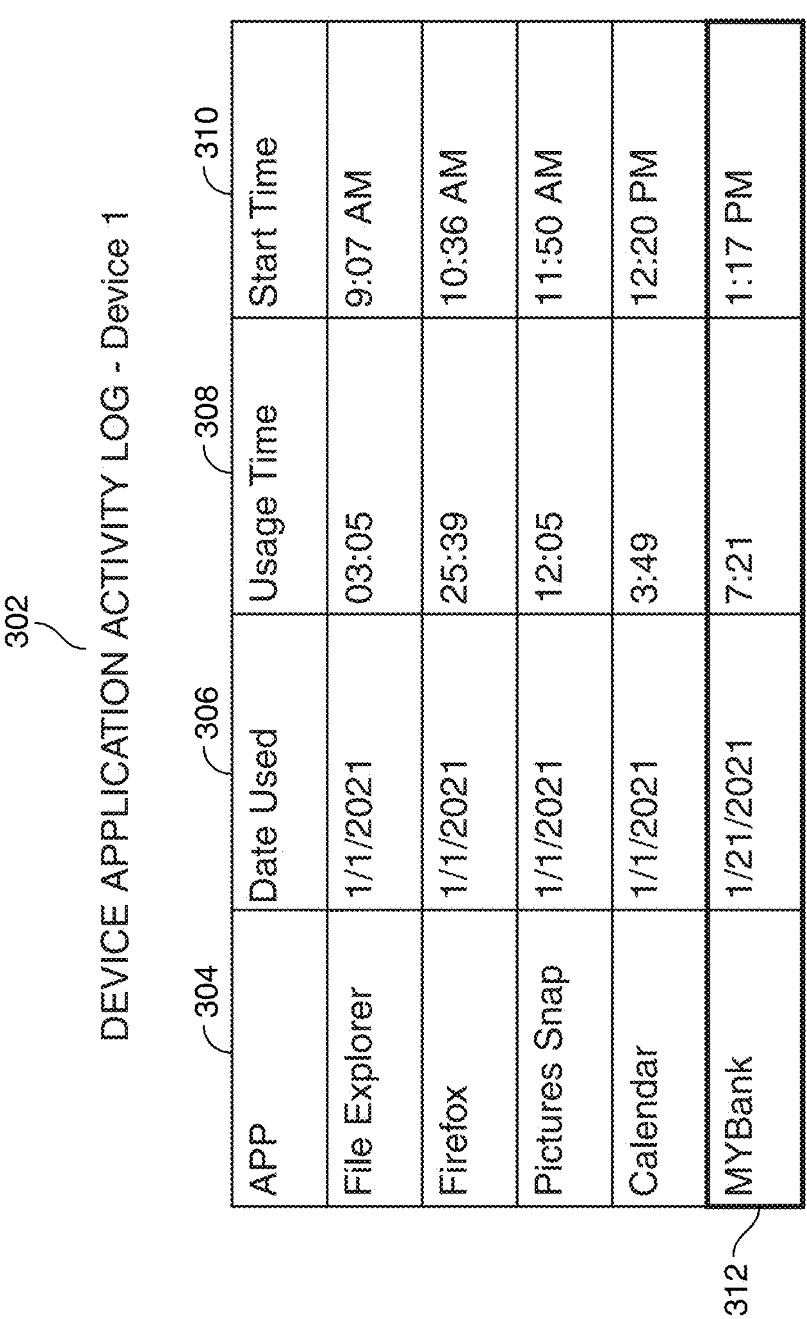
FIG. 3A shows an illustrative diagram in accordance with principles of the disclosure.

FIG. 3A shows an exemplary diagram of a device application activity log 302. Device application activity log 302 displays data associated with each application accessed on device 102. The data includes the name of the application 304. The data further includes the most recent date of access of the application, as shown at 306. The data further includes the usage time 308. Usage time 308 may include the total amount of time the application was in-use. The data further includes a start time 310. Start time 310 may be the time of day the application was accessed. Start time 310 may be the timestamp as described in the systems and methods of the invention.

At row 312, 'MyBank' application data activity is displayed. The 'MyBank' application, as described in FIG. 1, is the application for managing the user's account associated with the first mobile device when internet connection is disrupted. At 312, 'MYBank' is shown to have been accessed on Jan. 21, 1021 at 1:17 pm for a duration of seven minutes and 21 seconds.

Figure 3B:
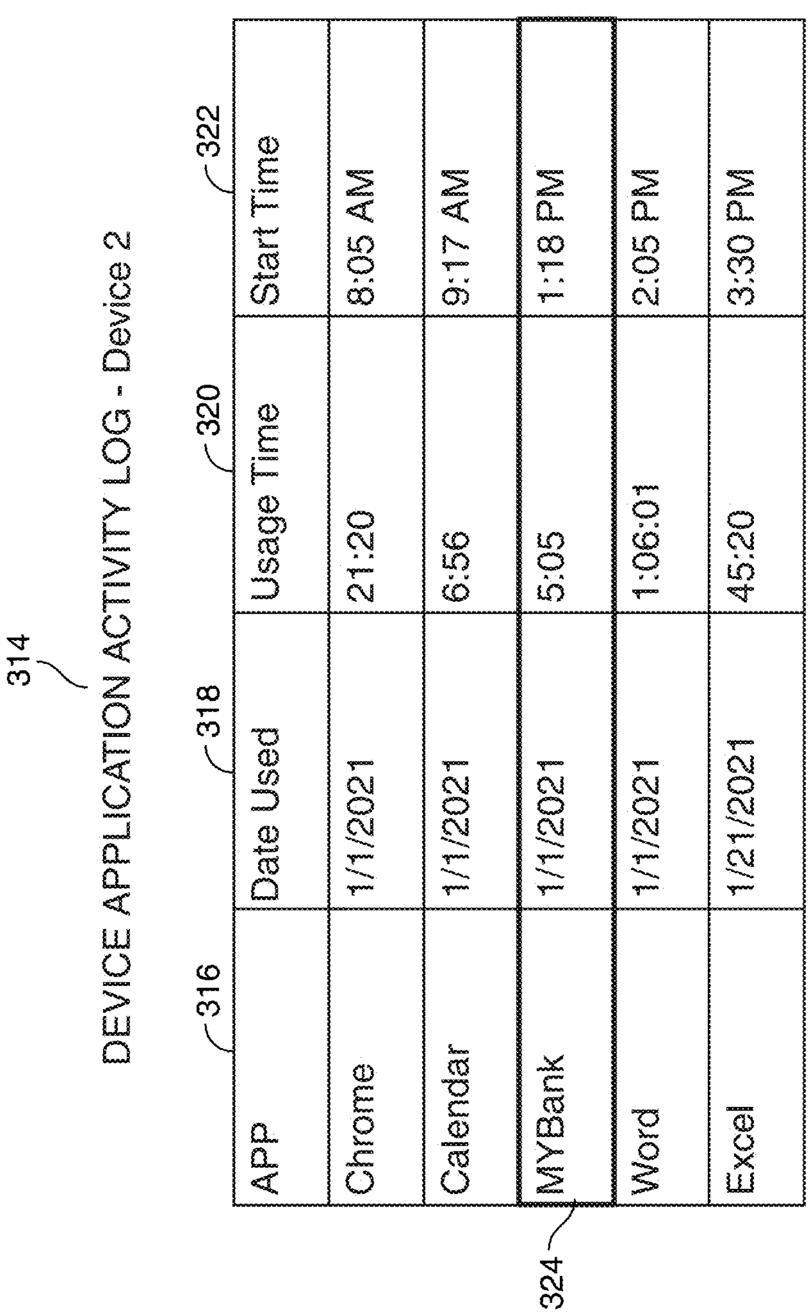
FIG. 3B shows an illustrative diagram in accordance with principles of the disclosure.

FIG. 3B shows an exemplary diagram of a device application activity log 314. Device application log 302 displays data associated with each application accessed on device 104. The data includes the name of the application 316. The data further includes the most recent date of access of the application, as shown at 318. The data further includes the usage time 320. Usage time 320 may include the total amount of time the application was in-use. The data further includes a start time 322. Start time 322 may be the time of day the application was accessed. Start time 322 may be the timestamp as described in the systems and methods of the invention.

At row 314, 'MYBank' application data activity is displayed. 'MYBank' at 314 is the application for managing the user's account associated with the second mobile device 104. This application is accessed when internet connection is disrupted. At 314, 'MYBank' is shown to have been accessed on Jan. 21, 1021 at 1:18 pm for a duration of five minutes and five seconds.

The central server 106, when internet connection is established following a disconnection, may receive transaction data. Central server 106 may retrieve device application log 302 from device 102. Central server 106 may retrieve device application log 314 from device 104.

Central server 106 may compare application entries at each row within logs 302 and 314. Central server 106 may identify entry 312 within log 302 to be associated with the 'MYBank' application. Central server 106 may identify entry 324 within log 314 to be associated with the 'MYBank' application.

Central server 106 may compare the start time for each of entries 312 and 324 to determine whether activity occurred within the same range of time. As illustrated, activity is determined to occur within the same range of time at both the 'MYBank' application at device 102 and the 'MYBank' application at device 104.

Figure 4A:
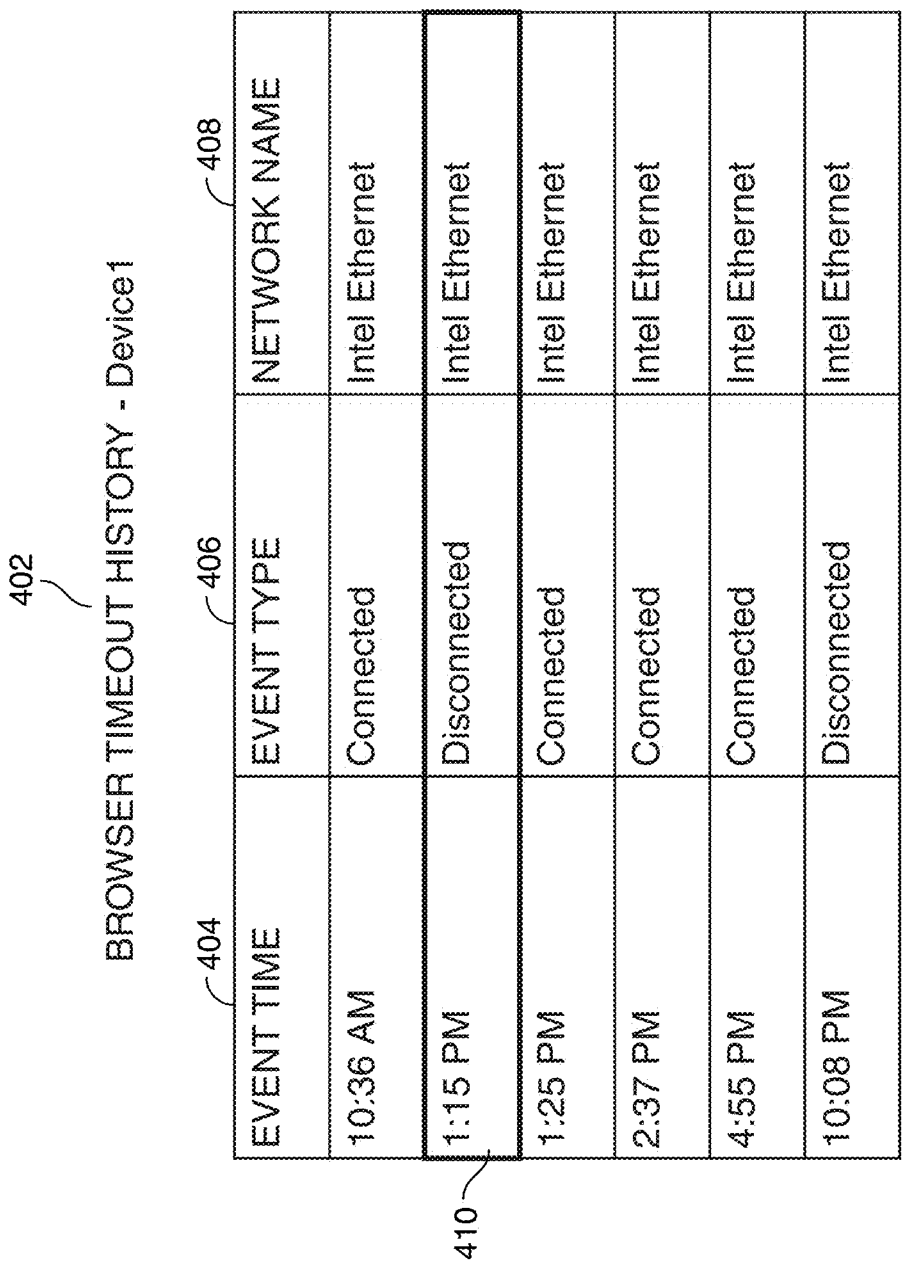
FIG. 4A shows an illustrative diagram in accordance with principles of the disclosure.

Additionally, central server 106 may compare the timestamp at entries 312 and 324 to the Wifi history log entries illustrated in FIG. 4A and 4B to determine whether the 'MYBank' applications were active while internet was disconnected.

FIG. 4A shows an exemplary diagram of a browser timeout history 402. Browser timeout history 402 may be a table displaying browser history associated with device 102. Browser timeout history 402 may display data associated with Wifi events. A Wifi event may be, for the purposes of the disclosure, an attempt to connect to the internet on the associated device.

The data associated with the event may include an event time 404. Event time 404 may display the time the event was initiated. The data may also include an event type 406. Event type 406 may display an outcome of the attempt to connect. The outcome may be 'connected' or 'disconnected.' When 'connected' this implies that the attempt to connect to the internet was successful. When 'disconnected' this implies that the attempt to connect to the internet was unsuccessful. The data may further include a network name 408. Network name 408 may include the name of the network used for connecting to the internet.

At row 410, an attempt to connect to the internet was initiated at 1:15 pm. Event type 406 displays that the attempt was unsuccessful, and the internet was disconnected.

FIG. 4B shows an exemplary diagram of a browser timeout history log 402. Browser timeout history log 402 may be a table displaying browser history associated with device 102. Browser timeout history log 402 may display data associated with Wifi events. A Wifi event may be, for the purposes of the disclosure, an attempt to connect to the internet on the associated device.

The data associated with the event may include an event time 414. Event time 414 may display the time the event was initiated. The data may also include an event type 416. Event type 416 may display an outcome of the attempt to connect. The outcome may be 'connected' or 'disconnected.' When 'connected' this implies that the attempt to connect to the internet was successful. When 'disconnected' this implies that the attempt to connect to the internet was unsuccessful. The data may further include a network name 418. Network name 408 may include the name of the network used for connecting to the internet.

At row 420, an attempt to connect to the internet was initiated at 1:15 pm. Event type 414 displays that the attempt was unsuccessful, and the internet was disconnected.

It should be appreciated that FIG. 4A displays the browser timeout history associated with device 102. The browser timeout history log 402 may be linked to the activity log data illustrated and described in FIG. 3A. At row 312, the 'MYBank' application is shown to be active at 1:17 pm which aligns with the data displayed at row 410 herein. Row 410 displays that the internet was disconnected at 1:15 pm and therefore when a transaction was attempted to be performed, the internet was down and the 'MYbank' application was launched to perform the transaction.

Furthermore, FIG. 4B displays the browser timeout history associated with device 104. The browser timeout history log 412 may be linked to the activity log data illustrated and described in FIG. 3B. At row 324, the 'MYBank' application is shown to be active at 1:18 pm which aligns with the data displayed at row 420 herein. Row 420 displays that the internet was disconnected at 1:15 pm and therefore when a transaction was attempted to be performed, the internet was down and the 'MYbank' application was launched to receive the transaction request.

Figure 5:
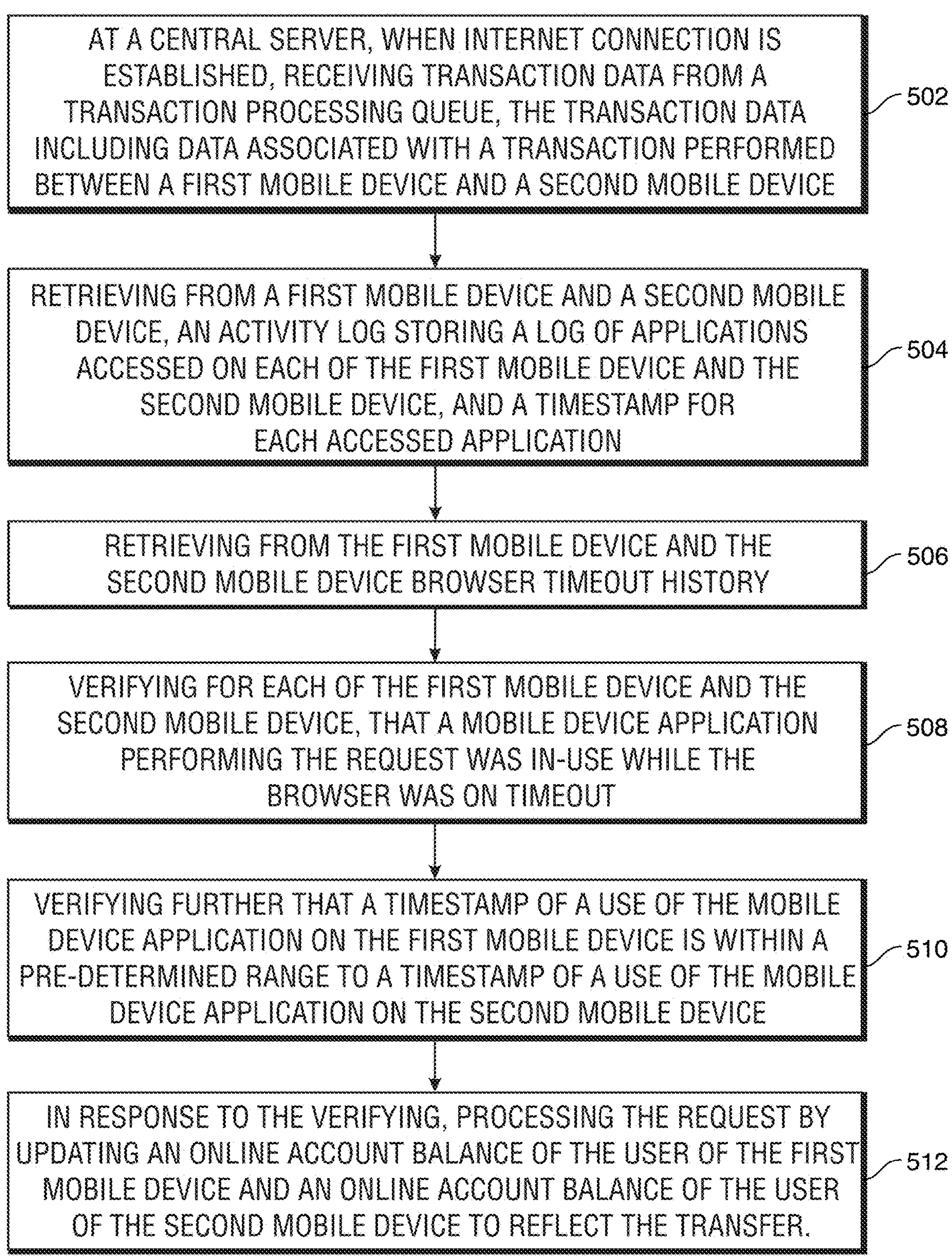
FIG. 5 shows an illustrative diagram in accordance with principles of the disclosure

FIG. 5 shows an illustrative flowchart of the method steps for facilitating electronic transactions following a disconnection from the internet.

At step 502, at a central server when internet connection is established, the method may include receiving transaction data from a transaction processing queue. The transaction data may include data associated with a transaction performed between a first mobile device and a second mobile device.

At step 504, the method steps may include retrieving from the first mobile device and the second mobile device, an activity log. The activity log may store a log of applications accessed on each of the first and second mobile device. The method step may further include retrieving a timestamp for each accessed application.

At step 506, the method step may include, retrieving from the first mobile device and the second mobile device, browser timeout history.

At step 508, the method step may include, verifying for each of the first and second mobile device, that a mobile device performing the request was in-use while the browser was on timeout.

At step 510, the method step may include, verifying further that a timestamp of a use of the mobile application on the first mobile device is within a pre-determined range to a timestamp of a use of the mobile application on the second mobile device.

At step 512, the method step may include, in response to the verifying, processing the request by updating an online account balance of the user of the first mobile device and an online account balance of the user of the second mobile device to reflect the transfer.

Figure 6:
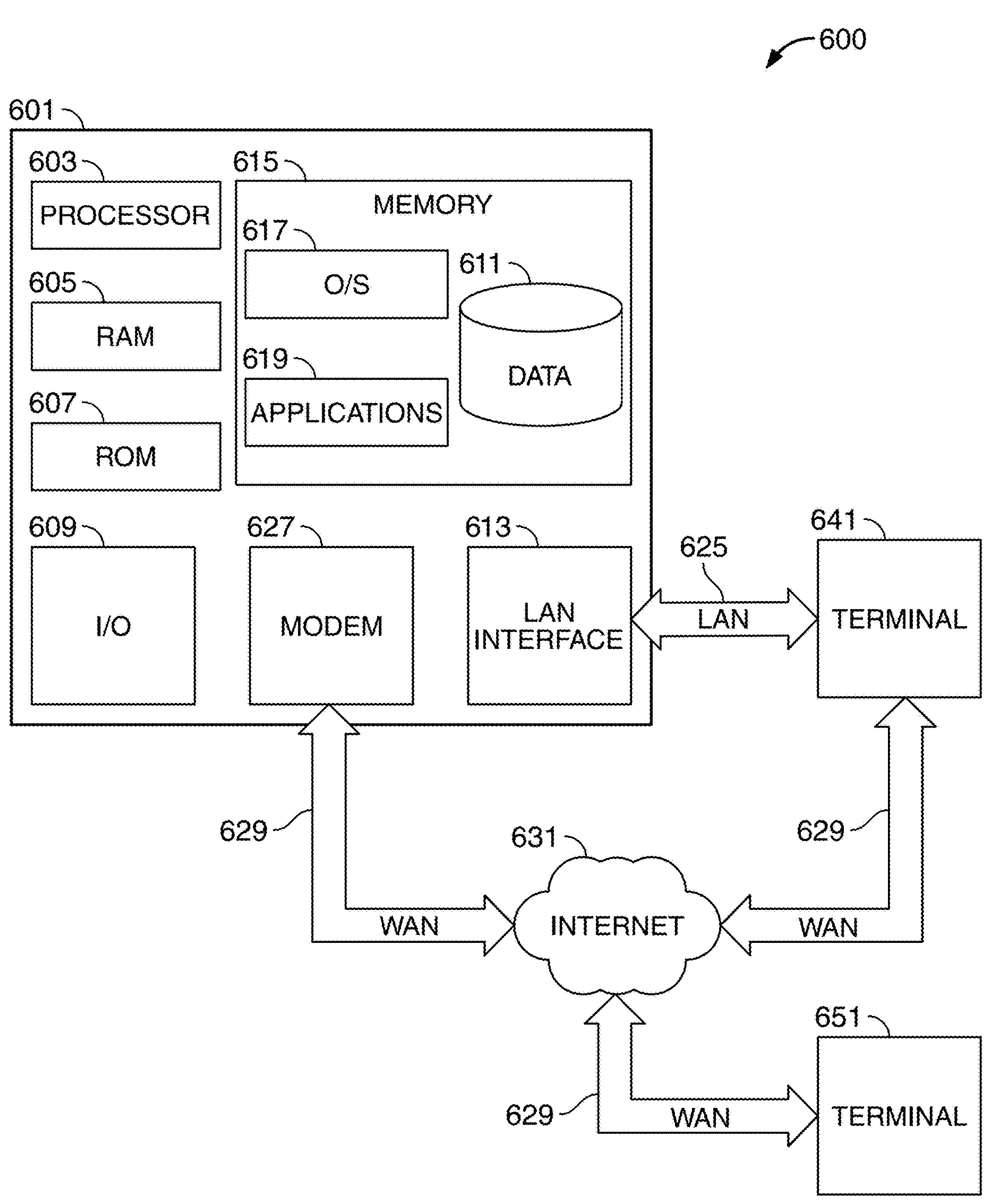
FIG. 6 shows an illustrative block diagram of apparatus in accordance with principles of the disclosure.

FIG. 6 shows an illustrative block diagram of system 600 that includes computer 601. Computer 601 may alternatively be referred to herein as an "engine," "server" or a "computing device." Computer 601 may be a workstation, desktop, laptop, tablet, smartphone, or any other suitable computing device. Elements of system 600, including computer 601, may be used to implement various aspects of the systems and methods disclosed herein. Each of device 102, device 104, central server 106, the first mobile application, the second mobile application, the online mobile application associated with the first mobile application and the online mobile application associated with the second mobile application, the periodically updated databases, may include some or all of the elements and apparatus of system 600.

Computer 601 may have a processor 603 for controlling the operation of the device and its associated components, and may include RAM 605, ROM 607, input/output circuit 609, and a non-transitory or non-volatile memory 615. Machine-readable memory may be configured to store information in machine-readable data structures. Other components commonly used for computers, such as EEPROM or Flash memory or any other suitable components, may also be part of the computer 601.

The memory 615 may be comprised of any suitable permanent storage technology—e.g., a hard drive. The memory 615 may store software including the operating system 617 and application(s) 619 along with any data 611 needed for the operation of computer 601. Memory 615 may also store videos, text, and/or audio assistance files. The data stored in Memory 515 may also be stored in cache memory, or any other suitable memory.

Input/output ("I/O") module 609 may include connectivity to a microphone, keyboard, touch screen, mouse, and/or stylus through which input may be provided into computer 601. The input may include input relating to cursor movement. The input/output module may also include one or more speakers for providing audio output and a video display device for providing textual, audio, audiovisual, and/or graphical output. The input and output may be related to computer application functionality.

Computer 601 may be connected to other systems via a local area network (LAN) interface 613. Computer 601 may operate in a networked environment supporting connections to one or more remote computers, such as terminals 641 and 651. Terminals 641 and 651 may be personal computers or servers that include many or all of the elements described above relative to computer 601. When used in a LAN networking environment, computer 601 is connected to LAN 625 through a LAN interface 613 or an adapter. When used in a WAN networking environment, computer 601 may include a modem 627 or other means for establishing communications over WAN 629, such as Internet 631.

In some embodiments, computer 601 may be connected to one or more other systems via a personal area network (PAN) (not shown). In these embodiments, computer 501 may communicate with one or more other terminals 641 and 651, which may be personal computers, servers, mobile phones, etc., using a PAN such as Bluetooth®, NFC, ZigBee®, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 619, which may be used by computer 601, may include computer executable instructions for invoking functionality related to communication, such as e-mail, Short Message Service (SMS), and voice input and speech recognition applications. Application program(s) 619 (which may be alternatively referred to herein as "plugins," "applications," or "apps") may include computer executable instructions for invoking functionality related to performing various tasks. Application programs 619 may utilize one or more algorithms that process received executable instructions, perform power management routines or other suitable tasks.

Application program(s) 619 may include computer executable instructions (alternatively referred to as "programs"). The computer executable instructions may be embodied in hardware or firmware (not shown). The computer 501 may execute the instructions embodied by the application program(s) 619 to perform various functions.

Application program(s) 619 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 619 may include one or more algorithms that may be used to implement features of the disclosure.

The invention may be described in the context of computer-executable instructions, such as applications 619, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 601 and/or terminals 641 and 651 may also include various other components, such as a battery, speaker, and/or antennas (not shown). Components of computer system 601 may be linked by a system bus, wirelessly or by other suitable interconnections. Components of computer system 601 may be present on one or more circuit boards. In some embodiments, the components may be integrated into a single chip. The chip may be silicon-based.

Terminal 651 and/or terminal 641 may be portable devices such as a laptop, cell phone, Blackberry™, tablet, smartphone, or any other computing system for receiving, storing, transmitting and/or displaying relevant information. Terminal 651 and/or terminal 641 may be one or more user devices. Terminals 651 and 641 may be identical to computer 601 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, and/or smart phones, multi-processor systems, microprocessor-based systems, cloud-based systems, programmable consumer electronics, network PCs, minicomputers, mainframe computers, distributed computing environments that include any of the above systems or devices, and the like.

Figure 7:
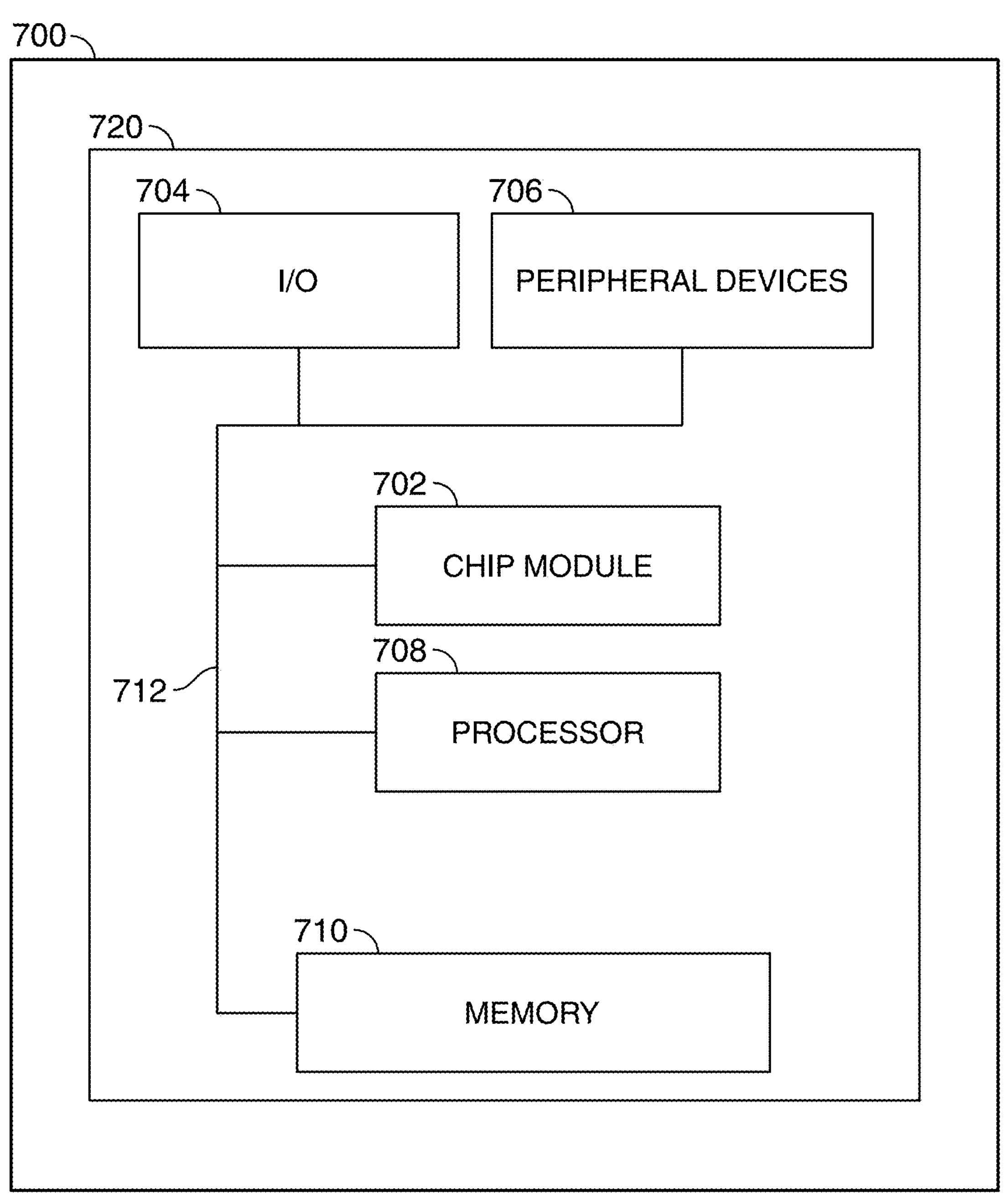
FIG. 7 shows an illustrative apparatus that may be configured in accordance with principles of the disclosure.

FIG. 7 shows illustrative apparatus 700 that may be configured in accordance with the principles of the disclosure. Apparatus 700 may be a computing device. Apparatus 700 may include chip module 702, which may include one or more integrated circuits, and which may include logic configured to perform any other suitable logical operations.

Apparatus 700 may include one or more of the following components: I/O circuitry 704, which may include a transmitter device and a receiver device and may interface with fiber optic cable, coaxial cable, telephone lines, wireless devices, PHY layer hardware, a keypad/display control device or any other suitable media or devices; peripheral devices 706, which may include counter timers, real-time timers, power-on reset generators or any other suitable peripheral devices; logical processing device 708, which may compute data structural information and structural parameters of the data; and machine-readable memory 710.

Machine-readable memory 710 may be configured to store in machine-readable data structures: machine executable instructions, (which may be alternatively referred to herein as "computer instructions" or "computer code"), applications such as applications 819, signals, and/or any other suitable information or data structures.

Components 702, 704, 706, 708 and 710 may be coupled together by a system bus or other interconnections 712 and may be present on one or more circuit boards such as circuit board 720. In some embodiments, the components may be integrated into a single chip. The chip may be silicon-based.

Thus, systems and methods for facilitating electronic transactions between a first mobile device and a second mobile device leveraging a short-range network when both the first mobile device and the second mobile device do not support internet connection is provided. Persons skilled in the art will appreciate that the present invention can be practiced by other than the described embodiments, which are presented for purposes of illustration rather than of limitation.

What is claimed is:

1. A system for facilitating electronic transactions between a first mobile device and a second mobile device leveraging a short-range network when both the first mobile device and the second mobile device fail to connect to a central server via the internet, the system comprising:

a first mobile application running on the first mobile device and supporting electronic communication with a central server, the first mobile device being configured to:

receive a request to initiate an electronic transaction with a recipient, the electronic transaction comprising a value of funds for transferring to the recipient;

access a periodically updated database storing a first account comprising an account balance, and, in response to a determination that the account balance is greater than the value of funds, authorize the request;

determine that the first mobile device fails to connect to the internet; and in response to the determining, transmit:

a short-range communication request to establish a communication session with a second mobile device within a distance of the first mobile device; and a verification request to the second mobile device, the verification request for verifying that a user of the second mobile device is the recipient;

a second mobile application running on the second mobile device and supporting electronic communication with the central server, the second mobile device being configured to:

in response to a receipt of the verification from the first mobile device, update an account balance of a second account associated with the recipient by increasing the account balance by an amount equal to the value of funds, the account balance stored at the second mobile device; and transmit transaction data associated with the transfer into a transaction processing queue;

the first mobile device is further configured to:

update the account balance of the first account to reflect the transfer; and transmit the transaction data into a transaction processing queue; and the central server is configured to:

determine that the internet connection has been established at the first mobile device and at the second mobile device;

in response to the determining that the internet connection has been established at the first mobile device and at the second mobile device, receive the transaction data from the transaction processing queue from the first mobile device and from the second mobile device;

request from the first mobile device:

a first activity log storing a log of applications accessed on the first mobile device and a timestamp for each accessed application; and a first browser timeout history;

request from the second mobile device:

a second activity log storing a log of applications accessed on the second mobile device and a timestamp for each accessed application; and a second browser timeout history; and following a receipt of the first activity log, the first browser timeout history, the second activity log and the second browser timeout history, verify that:

the first mobile application was active when a browser on the first mobile device was in timeout;

the second mobile application was active when a browser on the second mobile device was in timeout; and that a timestamp of use of the first mobile application is within a pre-determined range to a timestamp of a use of the second mobile application; and in response to the verifying, process the request within an online account associated with the user of the first mobile device and the user of the second mobile device by updating an online account of the user of the first mobile device and an online account of the user of the second mobile device to reflect the transfer.

2. The system of claim 1 wherein the first mobile application and the second mobile application are configured to display data and receive input on an associated user interface ("UI").

3. The system of claim 2 wherein the request to initiate the electronic transaction is inputted at the UI.

4. The system of claim 1 wherein, when it is determined that the first mobile application performing the request was not in-use while the browser was on timeout, the central server is configured to deny the request.

5. The system of claim 1 wherein, when it is determined that the timestamp of a use of the first mobile application is not within a pre-determined range of the timestamp of a use of the second mobile application, the central server is configured to deny the request.

6. The system of claim 1 wherein, at pre-determined intervals, the first mobile device and the second mobile device are configured to retrieve account data from the central server for each of the first account and the second account and update account data stored in the periodically updated database on each of the first mobile device and the second mobile device.

7. A method for facilitating electronic transactions between a first mobile device and a second mobile device leveraging a short-range network when both the first mobile device and the second mobile device fail to connect to a central server via the internet, the method comprising:

at the first mobile device:

authorizing a request to initiate an electronic transaction with a recipient, the electronic transaction comprising a value of funds for transferring to the recipient;

determining that the first mobile device fails to connect to the internet; and in response to the determining, transmitting:

a short-range request to establish a short-range communication session with the second mobile device within a distance of the first mobile device; and a verification request to the second mobile device, the verification request for verifying that a user of the second mobile device is the recipient;

at the second mobile device:

selecting to establish the short-range communication session with the first mobile device;

at the first mobile device, verifying that the user of the second mobile device is the recipient based on data retrieved from the second mobile device;

at the second mobile device:

in response to the verification by the first mobile device, updating an account balance of a second account associated with the recipient by increasing the account balance by an amount equal to the value of funds, the account balance stored in a periodically updated database at the second mobile device; and transmitting transaction data associated with the transfer into a transaction processing queue;

at the first mobile device, updating the account balance to reflect the transfer;

at a central server:

determining that the internet connection has been established at the first mobile device and at the second mobile device;

in response to the determining that the internet connection has been established at the first mobile device and at the second mobile device, receiving the transaction data from the transaction processing queue; and requesting from the first mobile device and the second mobile device, an activity log storing a log of applications accessed on each of the first mobile device and the second mobile device and a timestamp for each accessed application;

at the first mobile device and second mobile device, transmitting to the central server, the activity log; and at the central server:

receiving the activity log from the first mobile device and from the second mobile device:

verifying, for each of the first mobile device and the second mobile device, that a mobile application performing the request was in-use while performing the transfer; and in response to the verifying, processing the request by updating an online account of the user of the first mobile device and an online account of the user of the second mobile device to reflect the transfer.

8. The method of claim 7 further comprising, following a receipt of the activity log:

receiving browser timeout history from the first mobile device and from the second mobile device; and verifying that a timestamp of a use of the mobile application on the first mobile device is within proximity to a timestamp of a use of the mobile application on the second mobile device.

9. The method of claim 7 further comprising, prior to the verifying:

updating an account associated with a user of the first mobile device and a user of the second mobile device to include the electronic transaction and flagging the electronic transaction as pending; and following the processing of the request, updating a transaction status to complete.

* * * * *